April 8, 1924.

W. H. REES

CIRCUIT CLOSER

Filed Dec. 21, 1921

1,489,459

WITNESS

INVENTOR
WILLIAM H. REES
BY
*his* ATTORNEYS

Patented Apr. 8, 1924.

1,489,459

UNITED STATES PATENT OFFICE.

WILLIAM H. REES, OF BERKELEY, CALIFORNIA.

CIRCUIT CLOSER.

Application filed December 21, 1921. Serial No. 523,853.

*To all whom it may concern:*

Be it known that I, WILLIAM H. REES, a citizen of the United States of America, and a resident of Berkeley, county of Alameda, State of California, have invented a new and useful Circuit Closer, of which the following is a specification.

My invention relates to circuit closing devices and an object of the invention is to provide an improved circuit closer particularly adapted for use in the weighing apparatus which is the subject of my copending application, Serial Number 416,917, and which comprises a rotary hopper wheel into which the material to be weighed is dumped from a chute. The hopper is supported by the platform of a suitable scale, adjusted so that the beam is raised only when a predetermined unit load is in the hopper. The raising of the beam closes an electric circuit which controls magnetically operated mechanism for closing a gate to interrupt the flow of material to the hopper. My present invention comprises a quick acting circuit closer, the action of which is initiated by the movement of the scale beam. The primary object of the invention is the provision of a device whereby the slow movement of the scale beam may be utilized to effect the almost instantaneous closing of the circuit referred to, so that sparking and welding of the contact points are avoided.

My invention possesses other objects and features of advantage, some of which, with the foregoing, will be set forth in the following description of my invention. It is to be understood that I do not limit myself to the showing made by the said description, as I may adopt variant forms of my invention within the scope of the claims.

Figure 1:
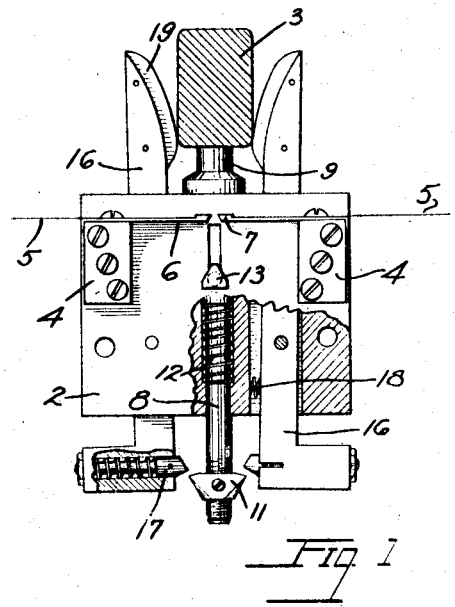
Figure 2:
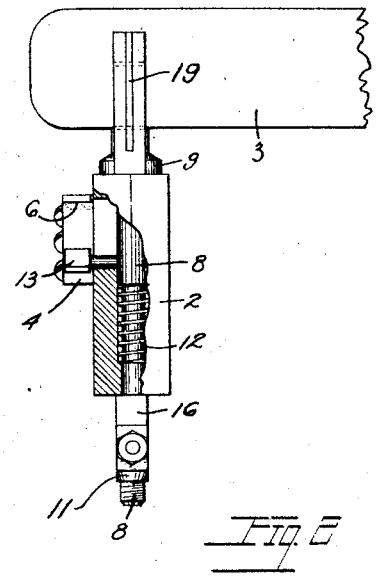
Figure 3:
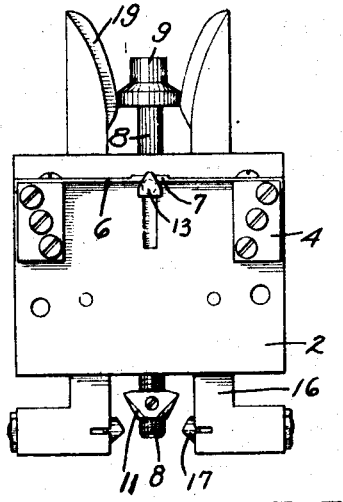
Figure 4:
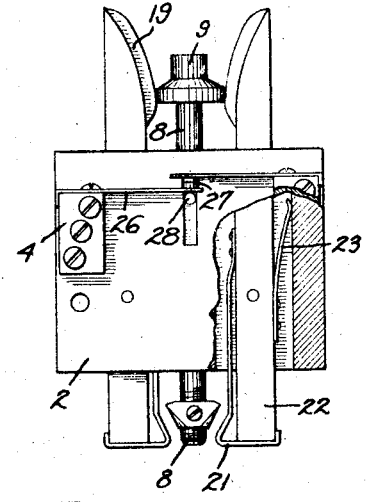

In the drawings, Fig. 1 is a front elevation of the device, showing the scale beam in section. The parts are shown in open-circuit position. Fig. 2 is a side elevation of the device showing the scale beam also in side elevation. Fig 3 is a view similar to that of Fig. 1, but with the parts in closed-circuit position. Fig. 4 is an elevation of a modified form of my device.

My invention comprises a housing 2 suitably mounted below the scale beam 3. Terminal blocks 4 in the circuit 5 to be controlled are mounted on the housing and in turn form mountings for the resilient contact arms 6, on which are beveled contact points 7, spaced apart so that the circuit of which the arms are a part is normally open. Slidably mounted in the housing is a plunger 8 having an upper head 9 and a lower head 11. The plunger is normally retained in its upper position by a spring 12 interposed between the plunger and the housing and in the upper position of the plunger a wedge form head 13 fixed thereon engages the beveled contact points 7 and closes the circuit. That is to say when the plunger is in the lower position with the spring 12 compressed the circuit is opened thru the contact arms and when the plunger has been raised by the spring 12 to its upper position the circuit is closed thru the contact arms. This structure has the advantage of positively breaking the circuit when the scale beam falls and is therefore unlikely to keep the circuit closed by sticking.

The position of the plunger is determined by the position of the scale beam. When the scale beam is down, as it is when there is no load on the platform the plunger is depressed and the circuit is open. When the scale beam rises as it does when a load is on the platform, the plunger may, when released by the mechanism of the device, rise to close the circuit.

Means are provided, also actuated by the scale beam, for retaining the plunger in the lower or depressed position after it has once been depressed and until the scale beam has nearly completed its upward movement when the plunger is suddenly released to quickly close the circuit thru the contact arms.

Pivoted in the housing on each side of the plunger is a lever 16 on the lower end of which is arranged a spring-pressed latch 17 so formed as to permit the beveled head 11 on the plunger to pass the latch on the downward movement of the plunger, but which retains the plunger in lower position by engagement with the upper face of the head. A spring 18 tends to press the lower end of the lever outwardly so that the latch is in inoperative position, that is, the springs 18 tend to rock the upper ends of the levers 16 toward each other, thus moving the latches apart and releasing the plunger.

The upper end of each arm is provided with a thin metallic shoe 19, arranged to be engaged by the scale beam so that downward movement of the scale beam causes the levers to rock apart and upward movement of the scale beam permits them to rock together or toward each other. The shoes are formed thin so that frictional resistance with the scale beam is reduced to a minimum.

In order to prevent the shoes from dragging on the scale beam and to keep them free from contact with the scale beam following the release of the plunger, the lower portion of the shoe is formed to be engaged by the plunger head 9, so that upward movement of the plunger throws the upper ends of the levers apart.

*Operation.*—With no load on the scale platform the parts are in the position shown in Fig. 1, with the circuit open thru the contact arms. With the accumulation of a full unit load on the scale platform, the scale beam rises, the upper ends of the levers bearing against it being allowed to approach each other under the pressure of the springs 18. Such movement of the levers separates the latches and finally the plunger is released, being driven sharply upwardly by the spring 12 and closing the circuit thru the contact arms. At the same time the upper head of the plunger acting on the lower edge of the shoe 19 throws outwardly the upper end of each lever so that there is no engagement with the scale beam. After the dumping of the load the scale beam falls, depressing the plunger and separating the upper ends of the levers so that the latches are in operative position once more.

In Fig. 4 I have shown a modified form of my apparatus in which the latches are formed of springs 21 comprising flat strips of spring metal bent as shown and fastened at the upper end to the arm 22 corresponding to arm 16 in Fig. 1. Flat springs 23 are interposed between the housing and the arms and take the place of springs 18 first explained. The spring contact arms 26 are arranged with contact points 27 normally held apart by the resilience of the arms. A pin 28 on the plunger presses the contact into engagement when the plunger rises.

I claim:

1. A circuit closer comprising spaced contacts disposed in the circuit to be controlled, a spring-pressed plunger movable from cocked position to engage said contacts to close the circuit, a pivoted lever, and spring means on said lever for retaining said plunger in cocked position.

2. A circuit closer comprising spaced contacts disposed in the circuit to be controlled, a spring-pressed plunger movable from cocked position to engage said contacts to close the circuit, a beveled head on said plunger, a pivoted lever, and a resilient latch in said lever for retaining said plunger in cocked position.

3. A circuit closer comprising spaced contacts disposed in the circuit to be controlled, a spring-pressed plunger movable from cocked position to engage said contacts to close the circuit, a latch mechanism including a pivoted lever for retaining said plunger in cocked position, a spring tending to move the lever to release the latch, and means for moving said plunger to cocked position and said lever to engage the latch.

4. A circuit closer to be actuated by a scale beam, comprising spaced contacts disposed in the circuit to be controlled, a spring-pressed plunger movable by said scale beam to cocked position and movable from cocked position to engage said contacts to close the circuit, a spring-pressed lever on each side of said plunger and arranged to be rocked apart by downward movement of the scale beam and to be permitted to rock toward each other by upward movement of the scale beam, and a latch on each lever moved into operative position when the levers are rocked apart for retaining said plunger in cocked position.

5. A circuit closer to be actuated by a scale beam, comprising spaced contacts disposed in the circuit to be controlled, a spring-pressed plunger movable by said scale beam to cocked position and movable from cocked position to engage said contacts to close the circuit, a spring-pressed lever on each side of said plunger and arranged to be rocked apart by downward movement of the scale beam and to rock toward each other during upward movement of the scale beam, a latch on each lever moved into operative position when the levers are rocked apart for retaining said plunger in cocked position, and means on said plunger for freeing said levers from contact with said scale beam when said plunger is released from cocked position.

6. A circuit closer comprising spaced contacts disposed in the circuit to be controlled, a spring-pressed plunger movable from cocked position to engage said contacts to close the circuit, and a latch mechanism including a pivoted lever for retaining said plunger in cocked position, a spring tending to move the lever to release the latch, means for moving said plunger to cocked position and said lever to engage the latch, and means operating when the plunger is released for separating said lever from said plunger moving means.

In testimony whereof, I have hereunto set my hand.

WILLIAM H. REES.